United States Patent
Hashimoto et al.

(10) Patent No.: US 8,750,858 B2
(45) Date of Patent: Jun. 10, 2014

(54) APPARATUS AND METHOD FOR DISTRIBUTING DATA AMONG MOBILE STATIONS VIA A BASE-STATION NETWORK

(75) Inventors: Masanori Hashimoto, Yokohama (JP); Takashi Murakami, Yokosuka (JP)

(73) Assignee: Fujitsu Limited, Kawasaki (JP)

(*) Notice: Subject to any disclaimer, the term of this patent is extended or adjusted under 35 U.S.C. 154(b) by 95 days.

(21) Appl. No.: 13/596,223

(22) Filed: Aug. 28, 2012

(65) Prior Publication Data

US 2013/0072181 A1 Mar. 21, 2013

(30) Foreign Application Priority Data

Sep. 16, 2011 (JP) ................................. 2011-203361

(51) Int. Cl.
*H04W 4/00* (2009.01)

(52) U.S. Cl.
USPC .................. 455/422.1; 455/414.3; 455/456.3; 455/524

(58) Field of Classification Search
CPC ....... H04W 4/02; H04W 4/025; H04W 4/023; H04W 24/00; H04W 4/028; H04W 64/00; H04W 4/021; H04W 4/043; H04W 4/027; H04W 4/06; H04W 4/12; G06Q 30/0261; H04M 1/72572
USPC .................................... 455/414.3, 456.3, 524
See application file for complete search history.

(56) References Cited

U.S. PATENT DOCUMENTS

| | | | |
|---|---|---|---|
| 6,947,754 B2 * | 9/2005 | Ogasawara | 455/456.3 |
| 7,200,394 B2 * | 4/2007 | Aoki et al. | 455/435.1 |
| 8,005,498 B2 * | 8/2011 | Ruotsi | 455/518 |
| 8,103,719 B2 * | 1/2012 | Weiser et al. | 709/203 |
| 8,155,671 B2 * | 4/2012 | Wood et al. | 455/456.3 |
| 8,468,154 B2 * | 6/2013 | Leino et al. | 707/724 |
| 2001/0044310 A1 * | 11/2001 | Lincke | 455/456 |
| 2002/0164995 A1 * | 11/2002 | Brown et al. | 455/456 |

(Continued)

FOREIGN PATENT DOCUMENTS

JP 2002-135844 5/2002

OTHER PUBLICATIONS

3GPP TS 36.300 V10.3.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011.

*Primary Examiner* — Liton Miah
(74) *Attorney, Agent, or Firm* — Katten Muchin Rosenman LLP

(57) ABSTRACT

An apparatus serves as a base station included in a base-station network. The apparatus transmits a range-check message, via the base-station network, to other base stations in the base-station network, where the range-check message includes designated-range information that defines a service-area range indicating a range of a service area to which distribution data is to be distributed within the base-station network. The apparatus detects response messages that are transmitted from one or more base stations included in the other base stations, via the base-station network, in response to the range-check message, where the response messages include cell information identifying cells that are covered by the one or more base stations. The apparatus transmits the cell information, via the base-station network, to a data-distribution apparatus that distributes the distribution data to one or more mobile stations located within the service-area range via the base-station network.

10 Claims, 11 Drawing Sheets

(56) References Cited

U.S. PATENT DOCUMENTS

| | | | |
|---|---|---|---|
| 2004/0110515 A1* | 6/2004 | Blumberg et al. | 455/456.1 |
| 2005/0148347 A1* | 7/2005 | Nagai | 455/456.6 |
| 2006/0034250 A1* | 2/2006 | Kim et al. | 370/350 |

* cited by examiner

FIG. 7

| MOBILE STATION | SERVICE AREA |
|---|---|
| MAIL ADDRESS 1 | BASE STATION INFORMATION 1 |
| MAIL ADDRESS 2 | BASE STATION INFORMATION 2 |
| ⋮ | ⋮ |

APPARATUS AND METHOD FOR DISTRIBUTING DATA AMONG MOBILE STATIONS VIA A BASE-STATION NETWORK

CROSS-REFERENCE TO RELATED APPLICATION

This application is based upon and claims the benefit of priority of the prior Japanese Patent Application No. 2011-203361, filed on Sep. 16, 2011, the entire contents of which are incorporated herein by reference.

FIELD

The embodiments discussed herein are related to an apparatus and method for distributing data among mobile stations via a base-station network.

BACKGROUND

Data distribution services have been available which distribute data to mobile stations located within a predetermined service area. One available example of a system that provides such services is an information distribution system in which an advertising entity sets an arbitrary zone and designates information for the zone. In the information distribution system, an information distribution server distributes information to mobile terminals that are located in the zone.

Examples of related art include Japanese Laid-open Patent Publication No. 2002-135844 and 3GPP TS 36.300, March 2011.

SUMMARY

According to an aspect of the invention, an apparatus serves as a base station included in a base-station network. The apparatus transmits a range-check message, via a base-station network, to other base stations in the base-station network, where the range-check message includes designated-range information that defines a service-area range indicating a range of a service area to which distribution data is to be distributed within the base-station network. The apparatus detects response messages that are transmitted from one or more base stations included in the other base stations, via the base-station network, in response to the range-check message, where the response messages includes cell information identifying cells that are covered by the one or more base stations. The apparatus transmits the cell information, via the base-station network, to a data-distribution apparatus that distributes the distribution data to one or more mobile stations located within the service-area range via the base-station network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of mobile-station designation information, according to a second embodiment;

DESCRIPTION OF EMBODIMENTS

In the data distribution system of the related art, rather than from a mobile station, data is distributed from a server apparatus connected through a network (such as a core network or a public network) that is a higher-order network than a wireless access network. Thus, when the provider of the distribution service sets the service area, an operator performs work for defining the distribution area to which the data is to be distributed. This makes the service-area setting cumbersome.

1. First Embodiment

1.1. System Configuration

Embodiment of the present technology will be described below with reference to the accompanying drawings.

Figure 1:
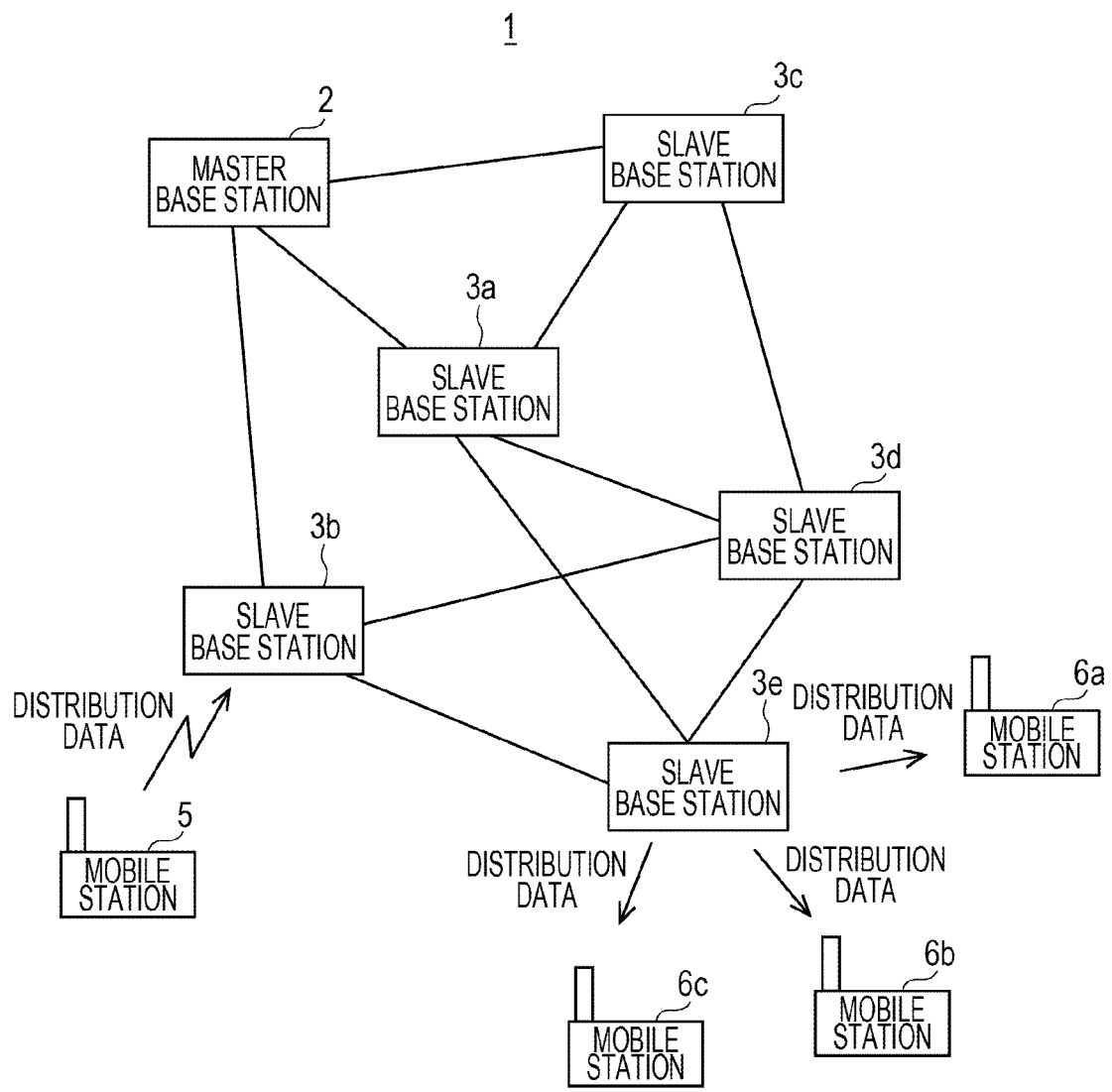
FIG. 1 is a diagram illustrating an example of an overall configuration of a communication system, according to an embodiment.

FIG. 1 is a diagram illustrating an example of an overall configuration of a communication system, according to an embodiment. A communication system 1 includes base stations 2 and 3a to 3e that constitute a base-station network, and mobile stations 5 and 6a to 6c that perform wireless communication with the base stations 2 and 3a to 3e.

In the communication system 1, a subscriber at the mobile station 5 sets a service area and provides an information distribution service for distributing information to the mobile stations 6a to 6c that are located in the service area. The information that is distributed to the mobile stations 6a to 6c using the information distribution service includes, for example, information regarding the service area. Such information regarding the service area may be, for example, service information regarding service facilities (such as shops), events, and festivals in the service area. The service information may be, for example, advertisement information or coupon information for the service facilities, the events, and the festivals. The information distributed to the mobile stations 6a to 6c may not be limited to information regarding the service area. Hereinafter, the information distributed using the information distribution service will be also referred to as "distribution data".

The subscriber at the mobile station 5, who is also the provider of the information distribution service, transmits distribution data from the mobile station 5 to the communication system 1. The communication system 1 includes a master base station 2 that has a distribution function for distributing the distribution data received from the mobile station 5. Each of slave base stations 3a to 3e receives the distribution data transmitted from the mobile station 5 located in a cell managed by the each slave base station, and transfers the received distribution data to the master base station 2. Upon receiving the distribution data distributed from the master base station 2, each of the slave base stations 3a to 3e transfers the distribution data to mobile stations located in the cell that is included in the service area and managed by the each slave base station, for example, to the mobile stations 6a to 6c.

In the description below and the accompanying drawings, the slave base stations 3a to 3e and the mobile stations 6a to 6c will also be collectively expressed as "slave base station 3" and "mobile station 6", respectively.

1.2. Service-Area Configuration Processing

Figure 2:
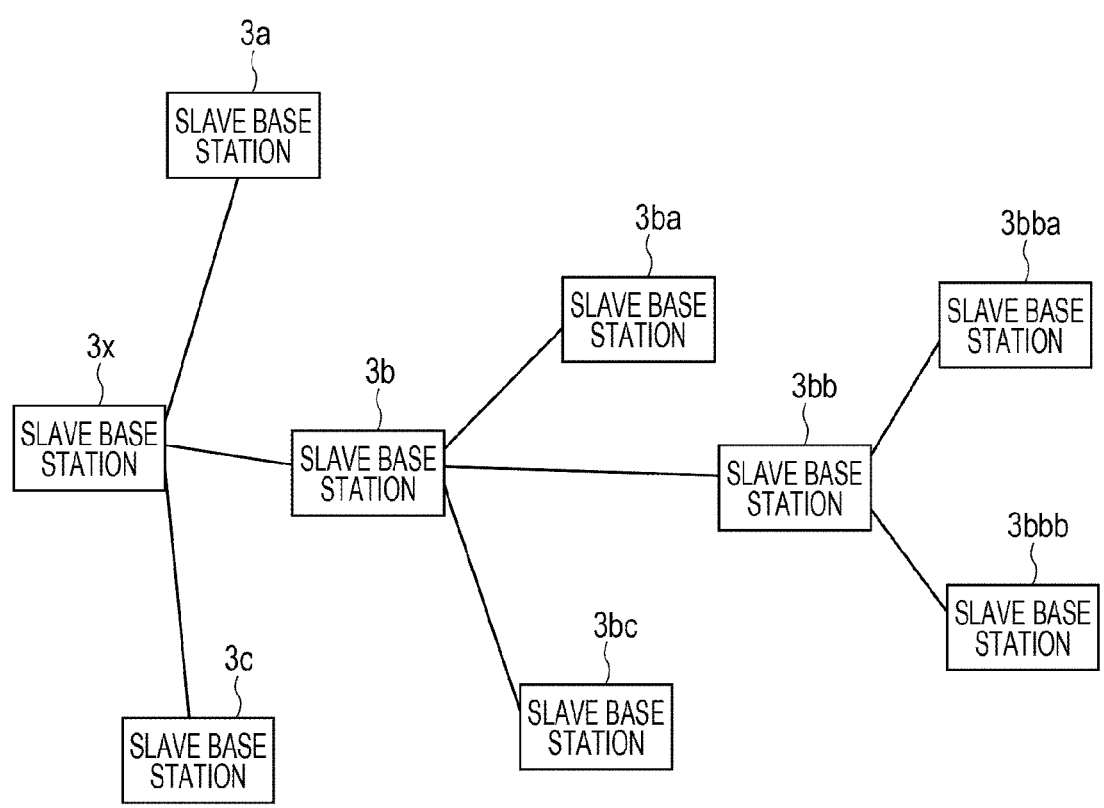
FIG. 2 is a diagram illustrating an example of an arrangement of slave base stations in a base-station network, according to an embodiment.

FIG. 2 is a diagram illustrating an example of an arrangement of slave base stations in a base-station network, according to an embodiment. A slave base station 3x is connected with slave base stations 3a to 3c through wired communication lines. No base stations are present along paths between the slave base station 3x and the slave base stations 3a to 3c, in other words, the slave base station 3x is located adjacent to each of the slave base stations 3a to 3c.

Similarly, the slave base station 3b is connected with slave base stations 3ba to 3bc via wired communication lines, and the slave base station 3b is located adjacent to each of the slave base stations 3ba to 3bc. The slave base station 3bb is connected with slave base stations 3bba and 3bbb via wired communication lines, and the slave base station 3bb is located adjacent to each of the slave base stations 3bba and 3bbb. Such base stations connected via the wired communication lines constitute a base-station network. The wired connection between the base stations may be implemented using, for example, internet protocol lines or X2 interfaces, which are standardized by 3GPP-LTE (Third Generation Partnership Project-Long Term Evolution).

Next, a description will be given of a first example of processing for configuring a service area to which distribution data is distributed in the communication system 1.

Figure 3:
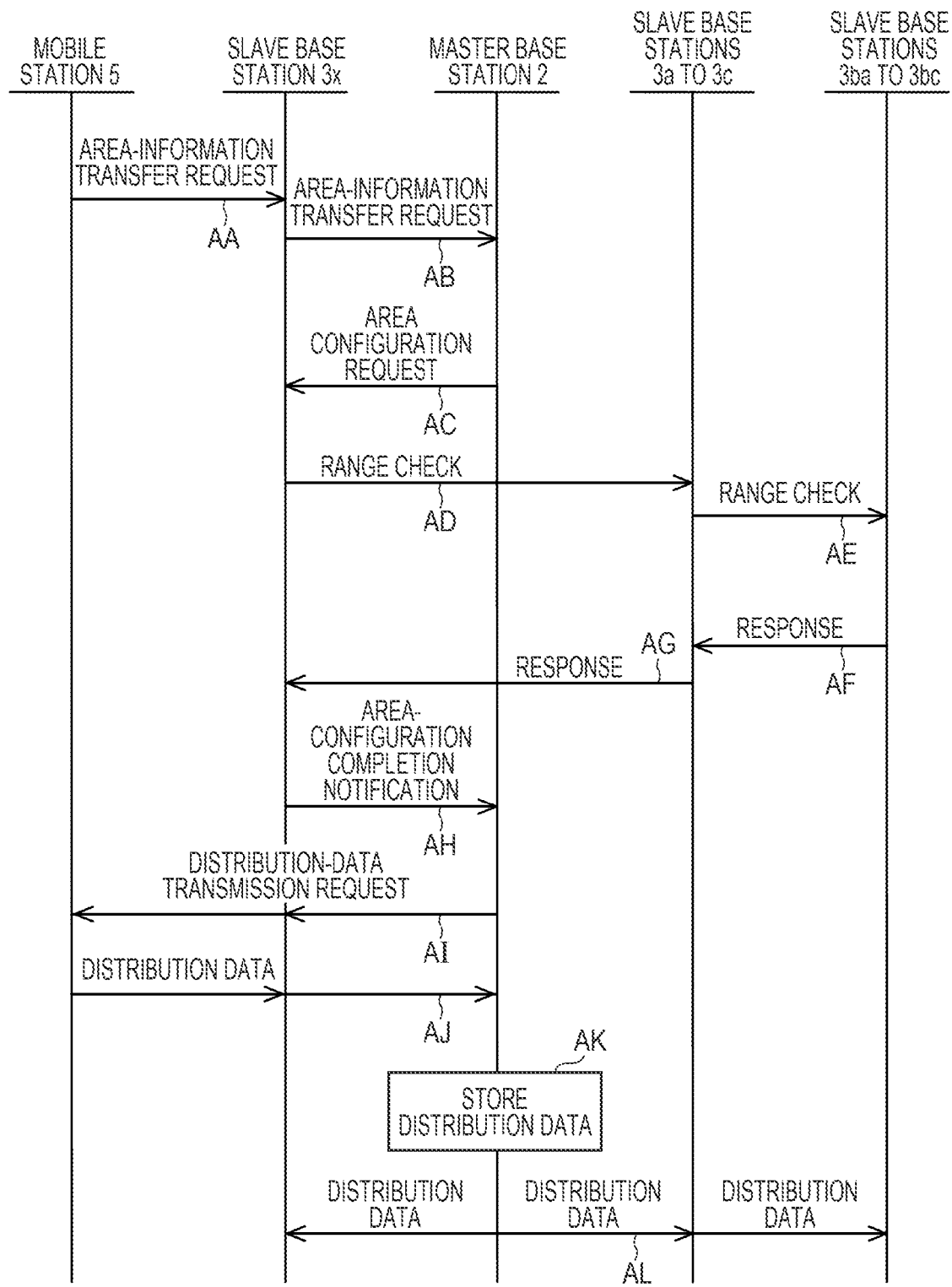
FIG. 3 is a diagram illustrating an example of an operational sequence for constructing a service area and for distributing distribution data, according to a first embodiment.

FIG. 3 is a diagram illustrating an example of an operational sequence for constructing a service area and for distributing distribution data, according to a first embodiment. FIG. 3 illustrates a first example of service-area configuration processing and a first example of data distribution processing in the arrangement illustrated in FIG. 2.

In operation AA, the mobile station 5 transmits an area-information transfer request to the slave base station 3x that covers a cell in which the mobile station 5 is located. The area-information transfer request is a message for requesting the slave base station 3x to transfer, to the master base station 2, area information identifying a service-area range indicative of the range of a service area to which distribution data is to be distributed. The area information may be range information that directly defines the range of a service area or basic information that identifies a predetermined method and parameters for defining the range of a service area.

The area-information transfer request according to the embodiment includes, as the basic information for defining the range of a service area, information indicating a maximum hop count value of a message that is sequentially transferred between adjacent base stations within the base-station network. In the case, the range of the service area is defined as a range of an area within the base-station network, in which a hop count of a message transferred from the slave base station 3x, which has received the area-information transfer request from the mobile station 5, is smaller than or equal to the maximum hop count value.

Hereinafter, the term "hop count" of a message refers to the number of times the message has been transferred between a pair of adjacent base stations within the base-station network. For example, when a message is transferred from the slave base station 3x to the adjacent slave base station 3b and the message is then transferred from the slave base station 3b to the adjacent slave base station 3bb, the hop count of the message becomes "2". Although a case in which the maximum hop count value is "2" is exemplified in this embodiment, the maximum hop count value may be changed depending on embodiments.

In operation AB, the slave base station 3x transfers the area-information transfer request to the master base station 2 via the base-station network.

In operation AC, the master base station 2 transmits, via the base-station network, an area-configuration request to the slave base station 3x that has received the area-information transfer request from the mobile station 5. The slave base station that has received the area-configuration request may hereinafter also be referred to as a "reference slave base station". The area-configuration request requests the reference slave base station 3x to determine base stations that cover cells included in a service-area range indicating the range of the service area specified by the area-information transfer request.

In order to report a service-area range to the reference slave base station 3x, the area-configuration request may be configured to include information specifying the range of a service area. In a manner similar to the area-information transfer request, the area-configuration request may be configured to include range information that directly defines the range of a service area or to include basic information identifying a predetermined method and parameters for specifying the range of a service area. In the case, the area-configuration request includes information indicating a maximum hop count value of a message as the basic information for specifying the range of a service area.

In operation AD, the reference slave base station 3x transmits a range-check message to the adjacent slave base stations 3a to 3c through the base-station network.

In operation AE, the slave base station 3b transmits a range check message to each of the adjacent slave base stations 3ba to 3bc via the base-station network. In this way, the range-check message is sequentially transferred, starting from the reference slave base station 3x, between adjacent base stations in the base-station network.

The range-check message includes designated-range information that specifies a range of a service area, in other words, a service-area-range. In one embodiment, the designated-range information may define a service-area range in which the position of the reference slave base station 3x is used as a reference position. The designated-range information in the embodiment includes hop-count information of the range-check message that is transferred between adjacent base stations. Hop-count information included in a range-check message according to the embodiment may be configured to take on a value obtained, by subtracting the hop count of the range-check message transferred by respective base stations, from the maximum hop count value included in the area-information transfer request. That is, each base station, upon receiving a range-check message, updates hop-count information included in the received range-check message by subtracting "1" from the hop-count information, and transmits the range-check message including the updated hop-count information to a next hop base station in the base-station network.

Thus, in operation AD, the value of hop-count information included in the received range-check message is "1" when the reference slave base station 3x transmits the range-check message to the adjacent slave base stations 3a to 3c.

In operation AE, the value of the hop-count information included in the range-check message is "0" when the slave base station 3b transmits the range-check message to the adjacent slave base stations 3ba to 3bc.

Since the value of the hop-count information included in the range-check message received by the slave base station 3bb is "0", the slave base station 3bb determines that the hop count of the range-check message reaches the maximum hop count value. When the hop count of the range-check message reaches the maximum hop count value, the slave base station 3bb does not transfer the range-check message any more to the adjacent slave base stations 3bba and 3bbb.

In operation AF, in response to the range-check message, the slave base station 3bb transmits a response message including base-station information regarding the slave base station 3bb to the adjacent slave base station 3b via the base-station network. The base-station information may include identification information identifying the slave base station 3bb and cell information identifying a cell covered by the slave base station 3bb.

In operation AG, upon receiving the response message from the slave base station 3bb, the slave base station 3b transmits, as a response to the range-check message, a response message including the base-station information of the slave base stations 3bb and 3b, to the adjacent reference slave base station 3x. Similarly, the slave base stations 3a and 3c transmit, as responses to the range-check messages, response messages including the respective base-station information to the reference slave base station 3x via the base-station network.

Upon receiving the response messages from the slave base stations 3a to 3c, the reference slave base station 3x generates a base-station list including a piece of base-station information of the reference slave base station 3x and pieces of base-station information of the slave base stations included in the received response messages. Hereinafter, a base-station list will be also referred to as "an area list". That is, the area list is a list of pieces of base-station information of the slave base stations reached by the range-check messages and specifies, as a service-area range, the range of the cells covered by the base stations that have returned response messages in response to the range-check messages.

In operation AH, the reference slave base station 3x transmits an area-configuration completion notification message to the master base station 2 via the base-station network. The area-configuration completion notification message includes the area list and notifies the master base station 2 that the determination of the base stations that cover cells included in the service-area range is completed. Upon receiving the area-configuration completion notification message, the master base station 2 holds the area list included in the received area-configuration completion notification message.

In the embodiment described above, a value obtained by subtracting the hop count of the range-check message from the maximum hop count value is used as a value of hop-count information. A range-check message according to another embodiment may be configured to include a maximum hop count value together with hop-count information indicating the hop count of the range-check message. In this case, each base station 3 transmitting the range-check message increments the value of the hop-count information included in the range-check message by "1", and each base station 3 receiving the range-check message compares the value of the hop-count information included in the received range-check message with the maximum hop count value included in the same range-check message so as to determine whether or not the hop count of the range-check message reaches the maximum hop count value.

1.3. Data Distribution Processing

Next, processing for distributing distribution data will be described with reference to FIG. 3.

In operation AI, the master base station 2 transmits, via the base-station network, a distribution-data transmission request to the slave base station 3x that covers the cell in which the mobile station 5 is located. The distribution-data transmission request is a message for requesting the mobile station 5 to transmit distribution data. The slave base station 3x transfers the distribution-data transmission request to the mobile station 5.

In operation AJ, the mobile station 5 transmits the distribution data. Upon receiving the distribution data, the slave base station 3x transfers the distribution data to the master base station 2 via the base-station network.

In operation AK, the master base station 2 stores the received distribution data in a storage device.

In operation AL, the master base station 2 distributes the distribution data to slave base stations 3 whose information is included in the area list held by the master base station 2, via the base-station network. Upon receiving the distribution data, each of the slave base stations 3 distributes the distribution data to mobile stations 6 that are located in the cell covered by the each slave base station 3.

1.4. Hardware Configuration

Figure 4:
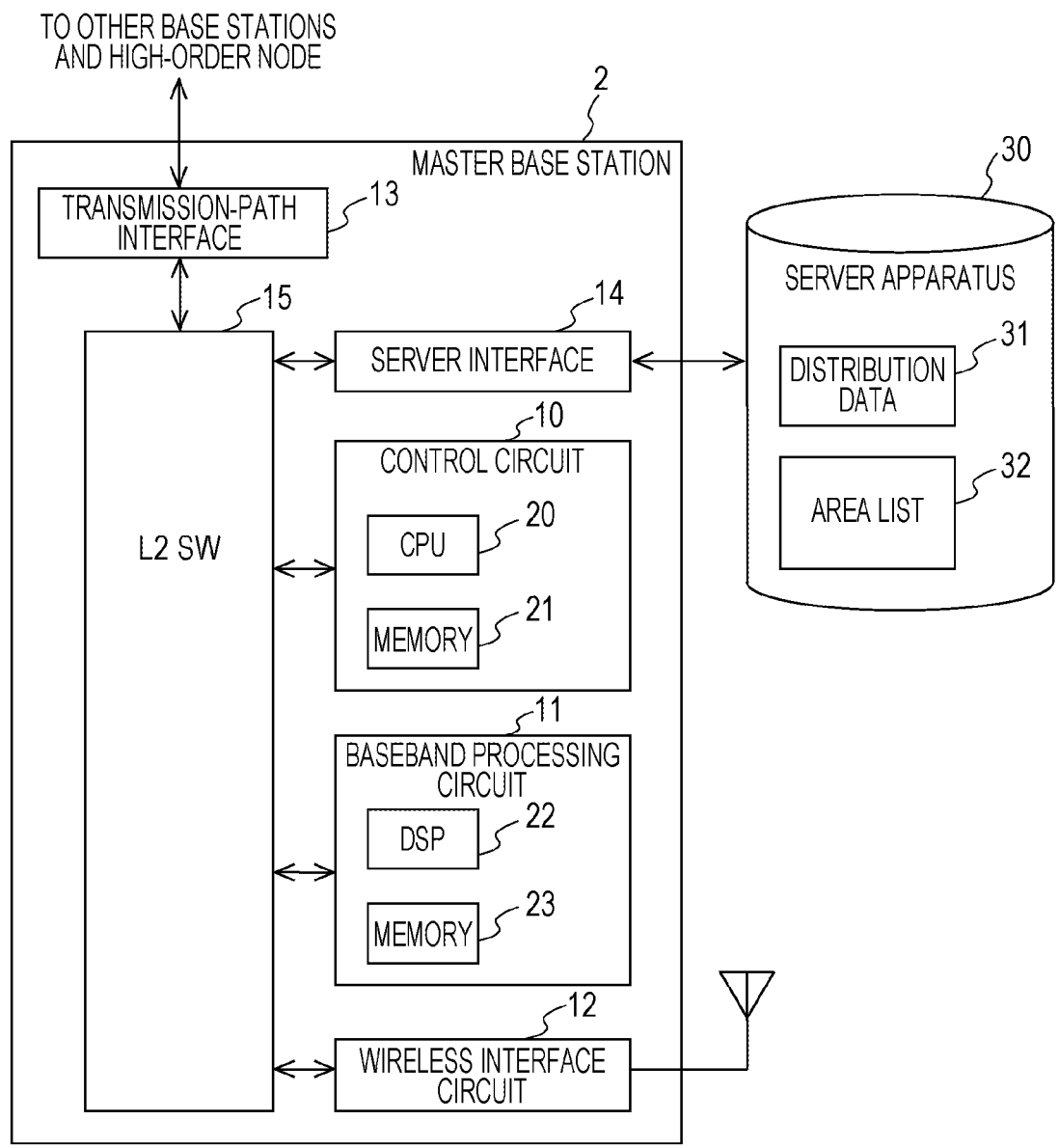
FIG. 4 is a diagram illustrating an example of a hardware configuration of a base station, according to an embodiment.

FIG. 4 is a diagram illustrating an example of a hardware configuration of a base station, according to an embodiment. For example, the master base station 2 may be configured to include a control circuit 10, a baseband processing circuit 11, a wireless interface circuit 12, a transmission-path interface 13, a server interface 14, and a layer-2 switch 15. The layer-2 switch 15 is represented as "L2 SW" in FIG. 4.

The control circuit 10 controls the entire operation of the master base station 2 and includes a CPU (central processing unit) 20 and a memory 21. The CPU 20 performs various types of processing (described below) by executing computer programs stored in the memory 21. The baseband processing circuit 11 executes baseband processing on signals transmitted to and received from the mobile station 5. The baseband processing circuit 11 includes a DSP (digital signal processor) 22 and a memory 23 in which firmware executed by the DSP 22 is stored.

The wireless interface circuit 12 is an interface circuit for wireless communication between the master base station 2 and the mobile stations 5 and 6. The transmission-path interface 13 is a communication interface circuit for the master base station 2 to communicate with the other base stations 3 via the base-station network or to communicate with a high-order node via another line. The server interface 14 is a communication interface circuit for communicating with a server apparatus 30 that holds distribution data 31 obtained from the mobile station 5 and an area list 32 received from the reference slave base station 3x. The layer-2 switch 15 is connected to the control circuit 10, the baseband processing circuit 11, the wireless interface circuit 12, the transmission-path interface 13, and the server interface 14 to perform exchange processing on layer-2 signals transmitted thereto and received therefrom.

The slave base station 3 may also be configured to have a hardware configuration that is similar to the hardware configuration of the master base station 2. The slave base station 3 may be configured not to include a server interface.

1.5. Block Diagram of Master Base Station

Elements of the master base station 2 and the functions of the elements will be described next.

Figure 5:
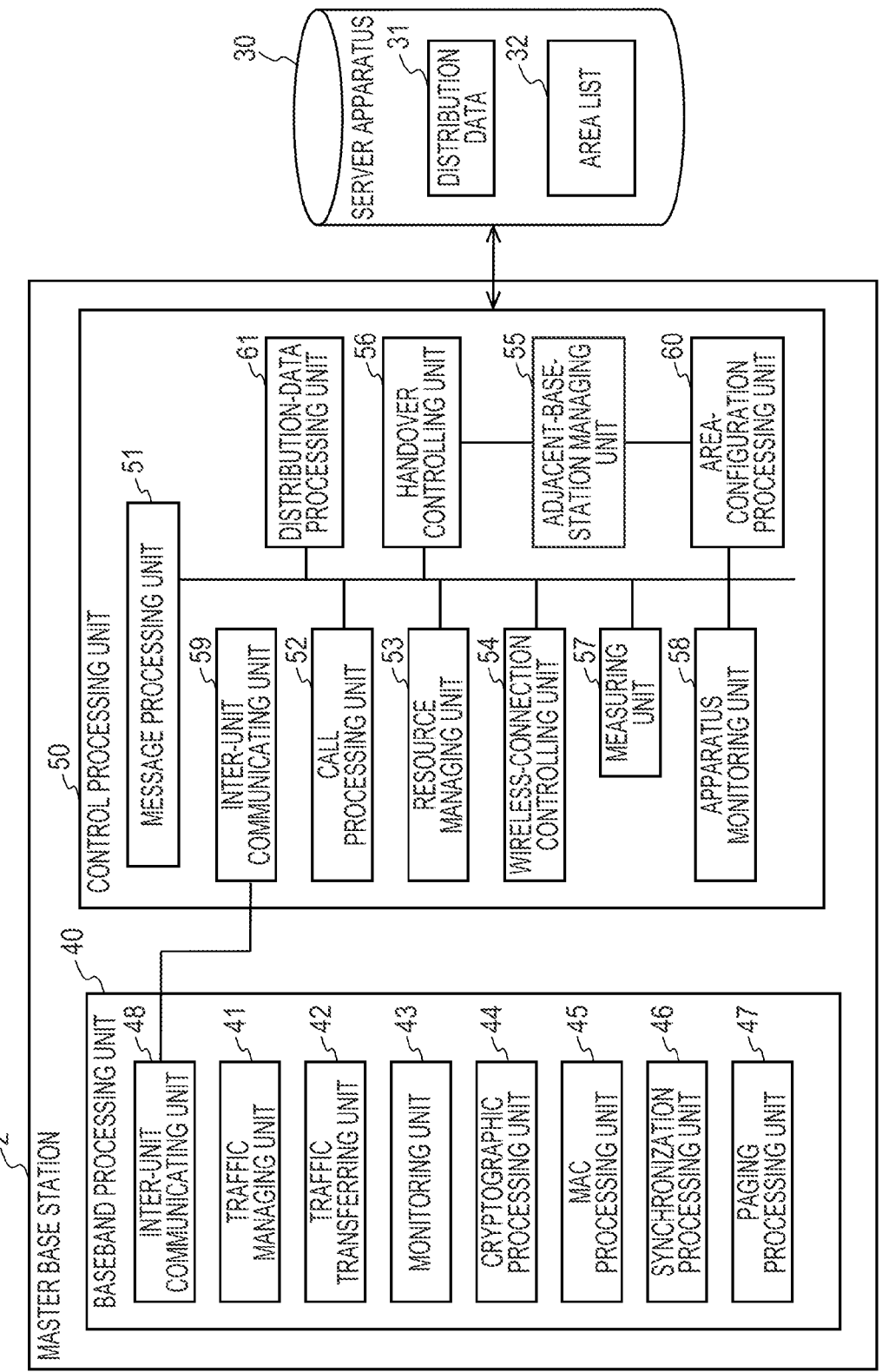
FIG. 5 is a diagram illustrating an example of a functional configuration of a master base station, according to an embodiment.

FIG. 5 is a diagram illustrating an example of a functional configuration of a master base station, according to an embodiment. The master base station 2 may be configured to include a baseband processing unit 40 and a control processing unit 50. The DSP 22 executes the firmware, stored in the memory 23, to execute processing performed by the baseband processing unit 40. The CPU 20 executes the computer program, stored in the memory 21, to execute processing performed by the control processing unit 50. FIG. 5 mainly illustrates functions related to descriptions given below. Thus, the master base station 2 may also be configured to include elements other than the elements illustrated in FIG. 5.

The baseband processing unit 40 may be configured to include a traffic managing unit 41, a traffic transferring unit 42, a monitoring unit 43, a cryptographic processing unit 44, a MAC (media access control) processing unit 45, a synchronization processing unit 46, a paging processing unit 47, and an inter-unit communicating unit 48. The traffic managing unit 41 manages an information bearer that transmits traffic between the mobile stations 5 and 6. The traffic transferring unit 42 performs processing for transferring traffic between the mobile stations 5 and 6. The monitoring unit 43 monitors the state of the traffic and the state of the cell covered by the master base station 2.

The cryptographic processing unit 44, the MAC processing unit 45, and the synchronization processing unit 46 perform cryptographic processing, medium-access control processing, and synchronization processing, respectively, in wireless communication between the master base station 2 and the mobile stations 5 and 6. The paging processing unit 47 performs call processing when the mobile station 5 or 6 in the cell has received an incoming call. The inter-unit communicating unit 48 performs processing for communication between the baseband processing unit 40 and the control processing unit 50.

The control processing unit 50 may be configured to include a message processing unit 51, a call processing unit 52, a resource managing unit 53, a wireless-connection controlling unit 54, an adjacent-base-station managing unit 55, a handover controlling unit 56, a measuring unit 57, an apparatus monitoring unit 58, and an inter-unit communicating unit 59. The control processing unit 50 may further include an area-configuration processing unit 60 and a distribution-data processing unit 61.

The message processing unit 51 performs protocol processing and processing for transmitting/receiving messages to/from the other base stations 3 and a higher-order node. The message processing unit 51 performs analysis processing for analyzing to which of the elements 52 to 58, 61, and 62 in the control processing unit 50 the received message is addressed.

The call processing unit 52 performs connection processing and release processing on a call that goes through the master base station 2. The resource managing unit 53 manages wireless resources to be allocated to wireless communication with the mobile stations 5 and 6. The wireless-connection controlling unit 54 controls connection relations with the mobile stations 5 and 6. The adjacent-base-station managing unit 55 stores information on base stations 3 located adjacent to the master base station 2. The handover controlling unit 56 performs processing for the handover of the mobile stations 5 and 6 between the master base station 2 and the adjacent base stations 3.

The measuring unit 57 instructs the baseband processing unit 40 to perform various types of measurement, such as measuring the quality of communication with the mobile station 5 or 6, and performs processing for analyzing the results of the measurement. The apparatus monitoring unit 58 performs processing for monitoring the states of the elements in the master base station 2. The inter-unit communicating unit 59 performs processing for communication between the baseband processing unit 40 and the control processing unit 50.

When the master base station 2 receives an area-information transfer request transmitted from the slave base station 3x, the area-configuration processing unit 60 detects that the mobile station 5 has started processing for setting a service area. On the basis of the service-area range specified by the area-information transfer request, the area-configuration processing unit 60 generates an area-configuration request for requesting determination of base stations that cover cells included in the service-area range. The area-configuration processing unit 60 transmits the area-configuration request to the slave base station 3x.

When the master base station 2 receives an area-configuration completion notification message transmitted from the slave base station 3x, the area-configuration processing unit 60 of the master base station 2 accesses the server apparatus 30 to store, in the server apparatus 30, the area list included in the area-configuration completion notification message.

The distribution-data processing unit 61 transmits a distribution-data transmission request to the slave base station 3x that covers the cell in which the mobile station 5 is located. When the master base station 2 receives the distribution data transferred from the slave base station 3x, the distribution-data processing unit 61 accesses the server apparatus 30 to store the distribution data in the server apparatus 30. The distribution-data processing unit 61 distributes the distribution data to the base stations 3 whose information is included in the area list.

1.6. Block Diagram of Slave Base Station

Elements of the slave base station 3 and the functions of the elements will be described next.

Figure 6:
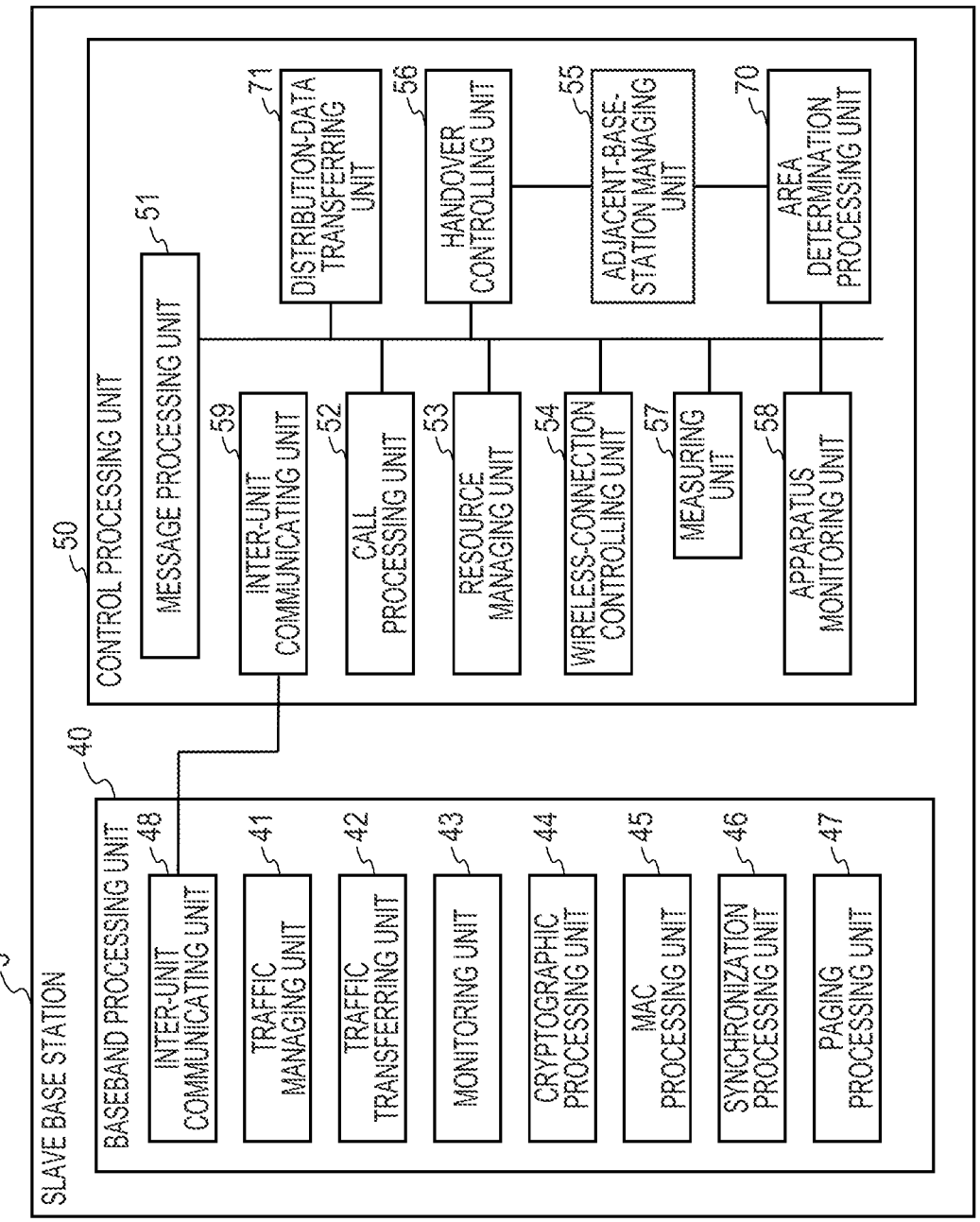
FIG. 6 is a diagram illustrating an example of a functional configuration of a slave base station, according to an embodiment.

FIG. 6 is a diagram illustrating an example of a functional configuration of a slave base station, according to an embodiment. The slave base station 3 includes elements that are similar to those of the master base station 2 illustrated in FIG. 5. The elements that are similar to those illustrated in FIG. 5 are denoted by the same reference numerals and descriptions of the same functions are omitted hereinafter.

The control processing unit 50 includes an area determination processing unit 70 and a distribution-data transferring unit 71. When the slave base station 3 receives an area-information transfer request transmitted from the mobile station 5 located in the cell managed by the slave base station 3, the area determination processing unit 70 of the slave base station 3 transfers the area-information transfer request to the master base station 2. When the slave base station 3 receives the area-configuration request transmitted from the master base station 2, the area determination processing unit 70 of the slave base station 3 generates designated-range information that specifies the service-area range, on the basis of the service-area range specified by the area-configuration request. The area determination processing unit 70 transmits a range-check message including the generated designated-range information to the adjacent slave base stations 3.

Meanwhile, when the slave base station 3 receives range-check message from the adjacent slave base station 3, the area determination processing unit 70 of the slave base station 3 determines whether or not the cell of the slave base station 3 belongs to the service-area range. In the case, when the hop count of the received range-check message is smaller than or equal to the maximum hop count value designated by the area-information transfer request, the area determination processing unit 70 determines that the cell of the slave base station 3 belongs to the service-area range. Otherwise, the area determination processing unit 70 determines that the cell of the slave base station 3 does not belong to the service-area range. When the cell of the slave base station 3 belongs to the service-area range, the area determination processing unit 70 updates the hop count information included in the range-check message by incrementing the hop count information by "1" and transfers the range-check message including the updated hop count information to the adjacent slave base stations 3.

When the hop count of the range-check message reaches the maximum hop count value, the area determination processing unit 70 transmits, as a response to the range-check message, to the adjacent slave base station 3 that is the transmission source of the range-check message, a response message including the base-station information of the slave base station 3. When each slave base station 3 receives the response message transmitted from the adjacent slave base station 3, the area determination processing unit 70 of the each slave base station 3 adds the base-station information of the each slave base station 3 to the received response message and transmits the resulting response message to another adjacent slave base station 3.

When the reference slave base station 3x receives the response message from the adjacent slave base station 3, the area determination processing unit 70 of the reference slave base station 3x generates an area list that includes the base-station information of the slave base stations 3 included in the response message and the base-station information of the reference slave base station 3x. The area determination processing unit 70 transmits an area-configuration completion notification message including the area list to the master base station 2.

When a slave base station 3 that covers the cell in which the mobile station 5 is located receives the distribution-data transmission request from the master base station 2, the distribution-data transferring unit 71 of the slave base station 3 transfers the distribution-data transmission request to the mobile station 5. When the slave base station 3 receives the distribution data from the mobile station 5, the distribution-data transferring unit 71 of the slave base station 3 transfers the received distribution data to the master base station 2.

When each slave base station 3 receives the distribution data distributed from the master base station 2, the distribution-data transferring unit 71 of the each slave base station 3 distributes the distribution data to the mobile stations 6 that are located in the cell covered by the each slave base station 3.

According to the embodiment, when the area-information transfer request that specifies the size of the service-area range is transmitted from the mobile station 5 to the slave base station 3, a service area for the information distribution service is configured. Accordingly, the service area for the information distribution service for distributing data to the mobile stations may be set with simpler processing than the processing in the related art.

According to the embodiment, messages transmitted/received for the purpose of setting a service-area and distribution data distributed using the set service-area are transmitted within the base-station network using the wireless connection line, i.e., only within the wireless access network. Thus, the information distribution system according to the embodiment may inhibit increase in load of a public network or a core network at a network layer higher than the wireless access network or may reduce the amount of load growth compared to the amount of load growth in the system of the related art.

The information distribution system according to the embodiment may be configured so that only the mobile stations 6 that are preregistered receive the distribution data. For example, the mobile station 6 may set information on select whether or not the distribution data is to be received, and may select reception of the distribution data based on the setting. The same also applies to other embodiments described below.

In another embodiment, the reference slave base station may be a base station other than the slave base station that receives the area-information transfer request from the mobile station 5. In this case, the area-information transfer request includes the position information identifying locations within the service-area range. The area-configuration processing unit 60 of the master base station 2 may select the reference slave base station on the basis of the position information included in the area-information transfer request and pre-stored position information identifying slave base stations 3. In this case, the mobile station 5 may use electronic mail to transmit the area-information transfer request to the master base station 2. The same also applies to other embodiments described below.

The area-configuration processing unit 60 and the distribution-data processing unit 61 of the master base station 2 may also be provided for the server apparatus 30. In such a case, the slave base station 3 has a server interface for communicating with the server apparatus 30. The server apparatus 30 may perform the service-area setting processing and the distribution-data distribution processing by exchanging, between the server apparatus 30 and the slave base station 3, the area-information transfer request, the area-configuration request, the area-configuration completion notification message, the distribution-data transmission request, and the distribution data. The same also applies to other embodiments described below.

Although the master base station 2 and the slave base station 3 are provided as separate apparatuses in the embodiment described above, all of the base stations 2 and 3 may each have functions of the master base station 2 and the slave base station 3. In such a case, it is unnecessary for all the base stations to access the server apparatus 30, and it is sufficient for some of the base stations to have interfaces with a server. The same also applies to other embodiments described below.

2. Second Embodiment

Another embodiment will be described next. In the embodiment described above, the mobile station 6 receives the distribution data when it is located in the service area. In a second embodiment, a subscriber at the mobile station 6 pre-registers a service area in which the subscriber desires to receive the distribution data. In the case, even when the mobile station 6 is absent in the service area when the distribution data is distributed to the mobile station 6, the distribution data is transmitted via electronic mail to the mobile station 6.

FIG. 7 is a diagram illustrating an example of mobile-station designation information, according to a second embodiment. As illustrated in FIG. 7, mobile-station designation information stores a service area in association with a mobile station. The master base station 2 may store mobile-station designation information in the server apparatus 30 or in the master base station 2. The mobile-station designation information includes, for example, information elements "mobile station" and "service area". The information element "mobile station" includes, for example, mail addresses of the mobile stations 6. The information element "service area" includes, for example, the base-station information of the base stations 3 located in the service area to which the distribution data is to be distributed.

Figure 8:
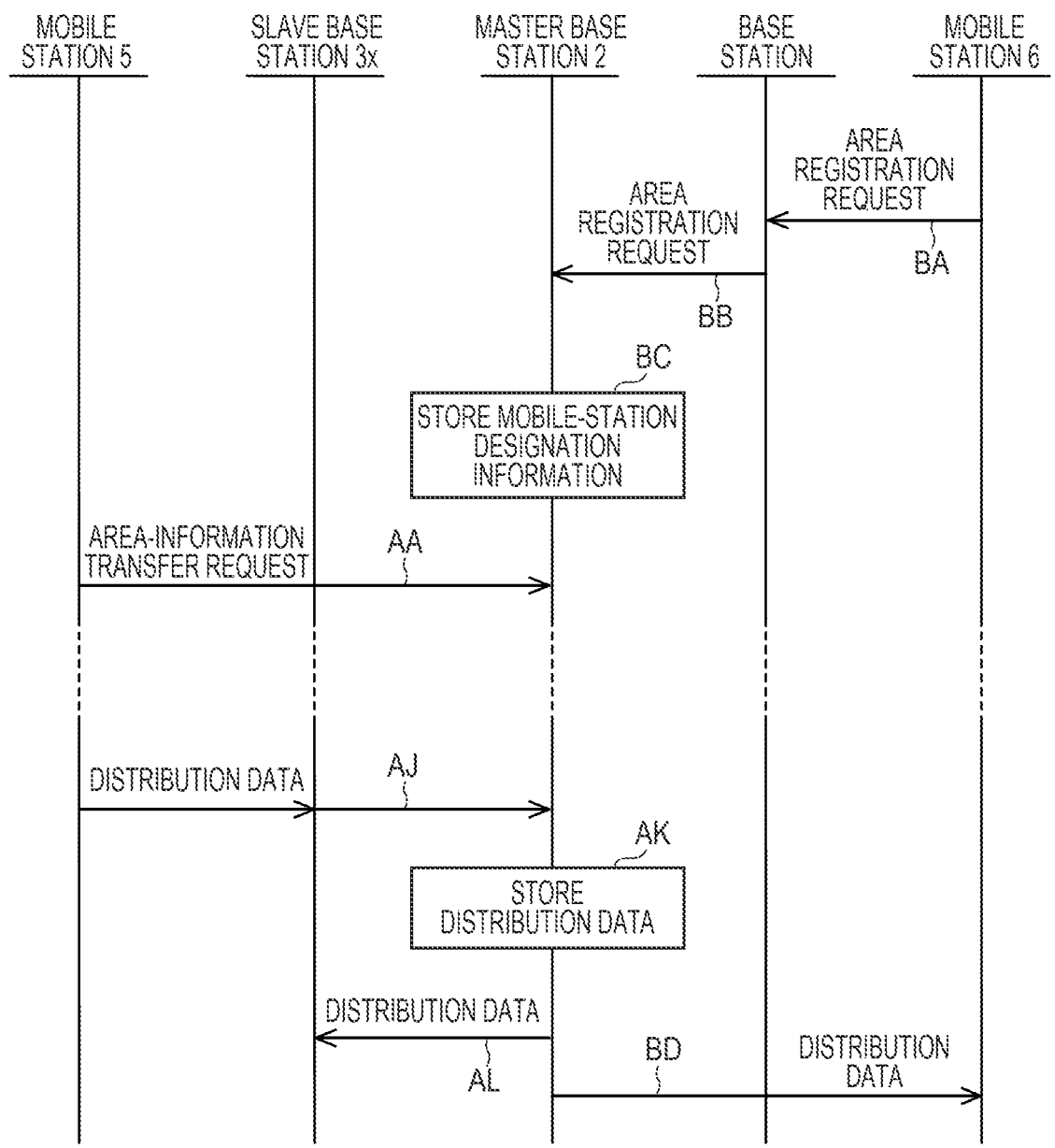
FIG. 8 is a diagram illustrating an example of an operational sequence for data distribution, according to a second embodiment.

FIG. 8 is a diagram illustrating an example of an operational sequence for data distribution, according to a second embodiment.

In operation BA, the mobile station 6 transmits an area registration request for registering a service area in which the subscriber at the mobile station 6 desires to receive the distribution data. The area registration request includes geographical-position information corresponding to the service area.

In operation BB, the distribution-data transferring unit 71 of a base station that covers the cell in which the mobile station 6 is located transfers the area registration request to the master base station 2.

In operation BC, the distribution-data processing unit 61 of the master base station 2 stores, in a storage device of the server apparatus 30, the mobile-station designation information that stores the mail address of the mobile station 6 that has transmitted the area registration request, in association with the base-station information corresponding to the geographical-position information included in the area registration request.

Processing in subsequent operations AA to AL is similar to the processing described above with reference to FIG. 3.

In operation BD, the distribution-data processing unit 61 of the master base station 2, for example, transmits the distribution data to the mobile station 6 using a mail address that is stored in the mobile-station designation information in association with the base station information which is included in the area list for the distribution area (the service area) to which the distribution data is to be distributed.

According to the second embodiment, the subscriber at the mobile station 6 may receive the distribution data distributed within the service area, even when the subscriber is located outside the service area.

3. Third Embodiment

Another embodiment will be described next. In the embodiments described above, the range of the service area (the service-area range) is determined based on the hop count of a range-check message transferred among slave base stations 3. According to a third embodiment, whether or not each slave base station 3 is in the service-area range is determined based on a distance between the reference position specified by the designated-range information and the position of the slave base station 3.

Figure 9:
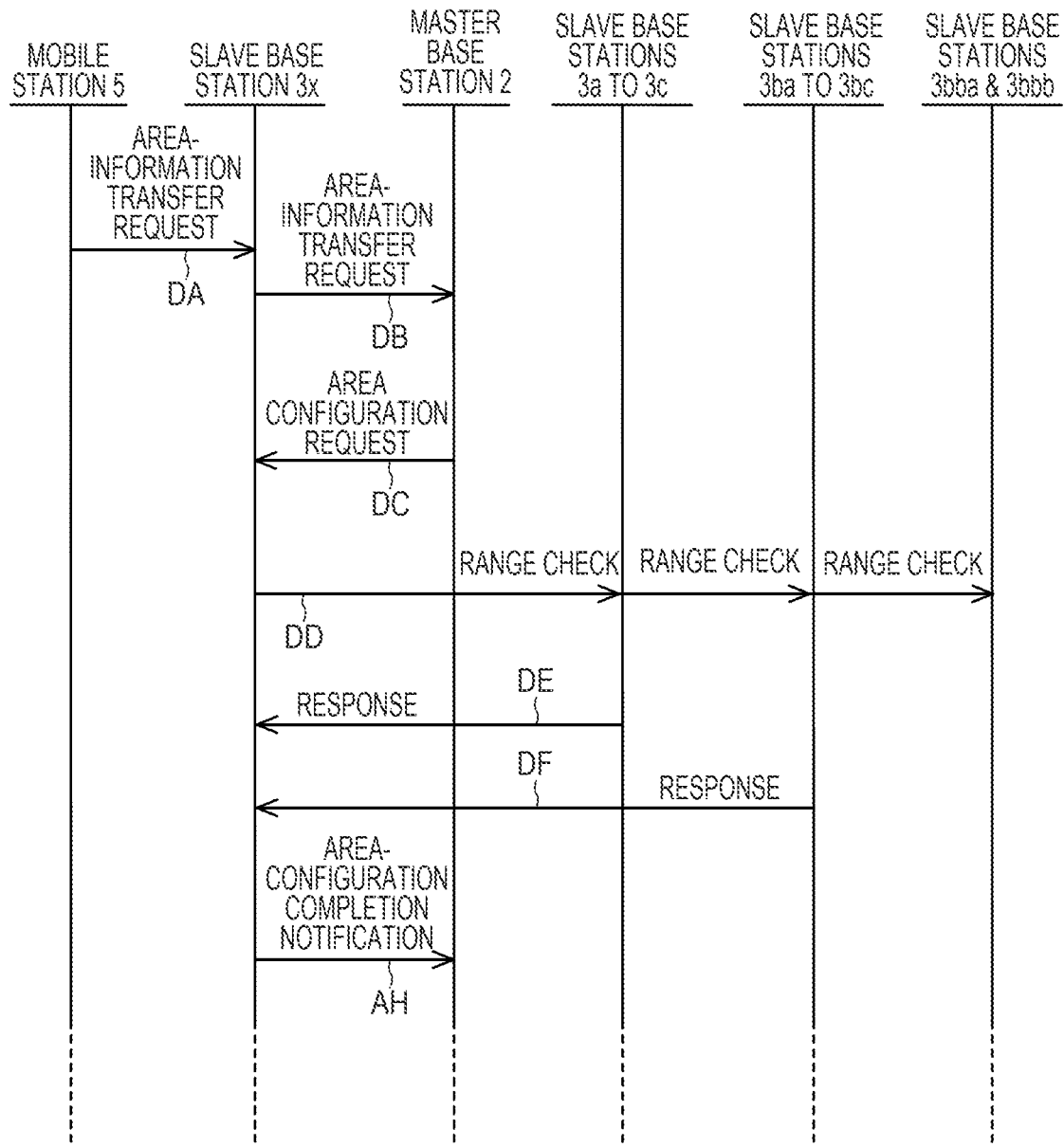
FIG. 9 is a diagram illustrating an example of an operational sequence for configuring a service-area, according to a third embodiment.

FIG. 9 is a diagram illustrating an example of an operational sequence for configuring a service-area, according to a third embodiment.

In operation DA, a mobile station 5 transmits an area-information transfer request to a slave base station 3x that covers a cell in which the mobile station 5 is located. The area-information transfer request includes, as basic information for determining a service-area range, the radial distance R of a service area.

In operation DB, the area determination processing unit 70 of the slave base station 3x transfers the area-information transfer request to the master base station 2 via the base-station network.

In operation DC, the area-configuration processing unit 60 of the master base station 2 transmits, via the base-station network, an area-configuration request to the slave base station 3x that has received the area-information transfer request from the mobile station 5. The area-configuration request may be configured to include the radial distance R of the service area.

The area determination processing unit 70 of the reference slave base station 3x determines a given position of the reference slave base station 3x as the reference position of the service area. The area determination processing unit 70 generates designated-range information including the reference position and the radial distance R of the service area.

In operation DD, the area determination processing unit 70 multicasts a range-check message including the generated designated-range information to the slave base stations 3a to 3c, 3ba to 3bc, 3bba, and 3bbb via the base-station network. In the third embodiment, the base-station network in which the range-check message is transmitted may be configured as an internet-protocol network.

On the basis of given position information of the slave base stations 3a to 3c, the area determination processing units 70 of the slave base stations 3a to 3c determine whether or not the slave base stations 3a to 3c are located in the range having its center at the reference position and having the radial distance R. When the slave base stations 3a to 3c are located in the range having its center at the reference position and having the radial distance R, the corresponding area determination processing units 70 determine that the cells of the respective slave base stations 3a to 3c are located within the range of a service area, that is, within the service-area range.

In operation DE, the area determination processing units 70 of the slave base stations 3a to 3c transmit response messages, as responses to the range-check message, to the reference slave base station 3x.

Similarly, the area determination processing units 70 of the slave base stations 3ba to 3bc, 3bba, and 3bbb determine whether or not the cells thereof are located within the service-area range. When the positions of the slave base stations 3ba to 3bc are located within the range having its center at the reference position and having the radial distance R, the area determination processing units 70 of the slave base stations 3ba to 3bc determine that the cells thereof are located in the service-area range.

In operation DF, the area determination processing units 70 transmits response messages, as responses to the range-check messages, to the reference slave base station 3x.

Meanwhile, when the slave base stations 3bba and 3bbb are located outside the range having its center at the reference position and having the radial distance R, the area determination processing units 70 of the base stations 3bba and 3bbb determine that the cells thereof are not located within the service-area range. In this case, the area determination processing units 70 of the base stations 3bba and 3bbb do not transmit response messages in response to the range-check message including the designated-range information.

Processing in subsequent operations AH to AL is similar to the processing in operations AH to AL described above with reference to FIG. 3. As a result of the responses in operations DE and DF, an area list indicating a service-area range is generated so as to include the base-station information of the slave base stations 3a to 3c and 3ba to 3bc.

The mobile station 5 in the third embodiment described above uses the area-information transfer request to specify the radial distance R of the service area. In another embodiment, the radial distance R may be a setting value predetermined in the system. In such a case, it is unnecessary for the area-information transfer request to specify the radial distance R.

In the embodiment described above, the position of the reference slave base station 3x is determined as the reference position. In another embodiment, the mobile station 5 may set, as the reference position, the position specified by the area-information transfer request. In such a case, the mobile station 5 may use electronic mail to transmit the area-information transfer request to the master base station 2. The same also applies to other embodiments described below.

In the third embodiment, a service-area range is determined based on the distance between the reference position and each slave base station 3. Therefore, according to the third embodiment, it is possible to specify a service-area range without being affected by the topology of the base-station network.

4. Fourth Embodiment

Another embodiment will be described next. In the third embodiment described above, even when the mobile station 6 is located in the service-area range, distribution data is not distributed from a slave base station 3 covering the cell in which the mobile station 6 is located when the slave base station 3 is not located in the service-area range.

According to a fourth embodiment, when a communication coverage range in which a slave base station 3 and the mobile station 6 are able to communicate with each other reaches the service-area range, the distribution data is distributed via the slave base station 3.

Figure 10:
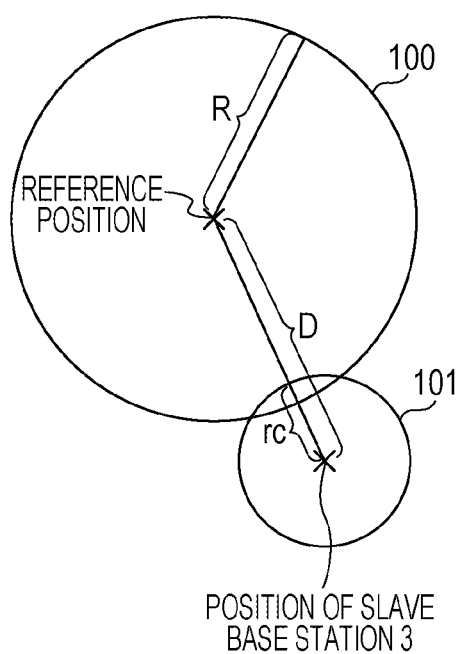
FIG. 10 is a schematic diagram illustrating an example of a service-area configuration, according to a fourth embodiment.

FIG. 10 is a schematic diagram illustrating an example of a service-area configuration, according to a fourth embodiment. Reference numeral 100 represents a service-area range whose center is used as the reference position and whose radial distance is R. Reference numeral 101 represents a communication coverage range of the slave base station 3 in which the slave base station 3 is able to directly communicate with a mobile station 6, and a maximum transmittable distance between the slave bases station 3 and the mobile station 6 is rc. The communication coverage range 101 may be the same as the range of a cell.

When the distance obtained by subtracting the maximum communication distance rc from a distance D between the reference position and the position of the slave base station 3 is smaller than or equal to the radial distance R, the area determination processing unit 70 of the slave base station 3 determines that a cell covered by the slave base station 3 is located within the service-area range. Otherwise, the area determination processing unit 70 determines that a cell covered by the slave base station 3 is not located within the service-area range.

According to the fourth embodiment, even when the slave base station 3 is located outside the service-area range, the distribution data may be distributed to the mobile station 6 that is located within a cell covered by the slave base station 3. As a result, the distribution data may be more reliably transmitted to the service area.

5. Fifth Embodiment

Another embodiment will be described next. In the fourth embodiment described above with reference to FIG. 10, even when the mobile station 6 is located outside the service-area range, the mobile station 6 receives the distribution data when the mobile station 6 is located within the communication coverage range 101 of the slave base station 3. According to a fifth embodiment, a slave base station 3 reduces the amount of traffic for the data distribution in a direction in which the communication coverage range between the slave base station 3 and the mobile station 6 does not reach the service-area range.

Figure 11A:
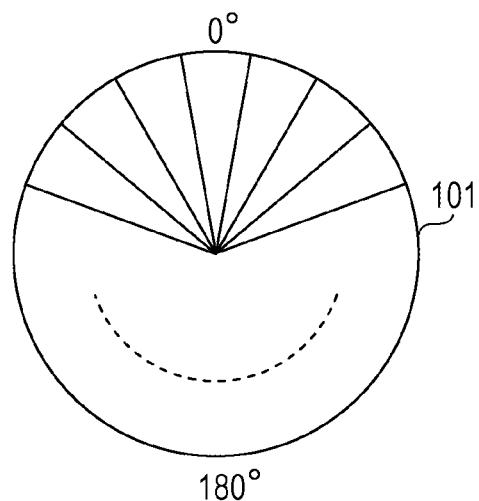
FIG. 11A is a schematic diagram illustrating an example of a communication coverage range of a slave base station, according to a fifth embodiment.

FIG. 11A is a schematic diagram illustrating an example of a communication coverage range of a slave base station, according to a fifth embodiment. The communication coverage range 101 of the slave base station 3 is divided into multiple ranges of sector areas that each spread out, in a fan-like form, in different directions from the center of the communication coverage range 101. For each of directions spreading out from the slave base station 3, a maximum transmittable distance rc within which the slave base station 3 is able to directly communicate with a mobile station 6 is predetermined and stored in the memory 21 in the slave base station 3.

Figure 11B:
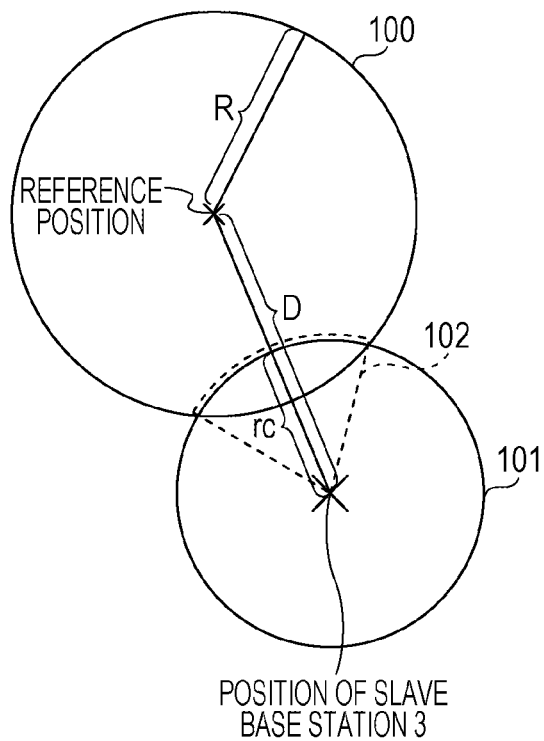
FIG. 11B is a schematic diagram illustrating an example of a service-area configuration, according to a fifth embodiment.

FIG. 11B is a schematic diagram illustrating an example of a service-area configuration, according to a fifth embodiment. The area determination processing unit 70 of the slave base station 3 determines the distance D between the reference position and the position of the slave base station 3 and a reference direction in which the reference position is located when viewed from the slave base station 3. The area determination processing unit 70 determines a range 102 of a first sector area that spreads out from the slave base station 3 to the directions in which a distance obtained by subtracting the corresponding maximum transmittable distance rc from the distance D is smaller than or equal to the radial distance R. The area determination processing unit 70 distributes the distribution data to the first sector area included in the range 102 and does not distribute the distribution data to other sector areas within the cell.

According to the fifth embodiment, the amount of traffic for distributing data distribution to the mobile stations 6 that are located outside the service-area range is reduced. As a result, it is possible to reduce the power consumed by the slave base station 3 and it is also possible to significantly reduce unwanted reception processing performed by the mobile stations 6 that are located outside the service-area range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for distributing data among mobile stations via a base-station network, the apparatus serving as a base station included in the base-station network, the apparatus comprising:
a processor to:
transmit a first range-check message, via the base-station network, to other base stations in the base-station network, the first range-check message including designated-range information that defines a service-area range indicating a range of a service area to which distribution data is to be distributed within the base-station network;
detect first response messages that are transmitted from one or more base stations included in the other base stations, via the base-station network, in response to the first range-check message, the first response messages including first cell information identifying cells that are covered by the one or more base stations; and
transmit the first cell information, via the base-station network, to a data-distribution apparatus that distributes the distribution data to one or more mobile stations located within the service-area range via the base-station network, wherein
the processor, upon receiving a second range-check message from another base station in the base-station network, determines whether a cell covered by the apparatus belongs to the service-area range defined by the designated-range information included in the received second range-check message;
when it is determined that a cell covered by the apparatus belongs to the service-area range defined by the designated-range information, the processor transmits a second response message including second cell information identifying a cell covered by the apparatus, to the another base station via the base-station network;
the processor, upon receiving the second range-check message from a first adjacent base station located adjacent to the apparatus, transfers the received second range-check message to a second adjacent base station located adjacent to the apparatus;
the designated-range information defines, as the service-area range, a hop count of the second range-check message, the hop count of the second range-check message indicating a number of times the second range-check message is transferred between a pair of adjacent base stations in the base-station network; and
the processor determines whether a cell covered by the apparatus is within the service-area range defined by the designated-range information, based on the hop count of the second range-check message.

2. The apparatus of claim 1, wherein
the designated-range information includes position information indicating a reference position of the service-area range and distance information indicating a radial distance of the service-area range; and
the processor determines whether a cell covered by the apparatus is within the service-area range defined by designated-range information, based on the radial distance of the service-area range and a first distance between a position of the apparatus and the reference position of the service-area range.

3. The apparatus of claim 2, wherein
the processor determines that a cell covered by the apparatus is within the service-area range defined by designated-range information when a second distance that is obtained by subtracting, from the first distance, a maximum transmittable distance within which the apparatus and a mobile station are able to directly communicate with each other is equal to or smaller than the radial distance of the service-area range.

4. The apparatus of claim 3, wherein
the processor determines whether each of sector areas within the cell covered by the apparatus belongs to the service-area range, based on the maximum transmittable distance obtained in association with each of directions spreading out from the apparatus.

5. The apparatus of claim 4, wherein,
the processor distributes the distribution data to a sector area that is located within the cell in directions in which the maximum transmittable distance associated with the sector area is determined to be smaller than or equal to the radial distance of the service-area range.

6. The apparatus of claim 2, wherein
the reference position of the service-area range is a position of a base station that transmits the range-check message including the designated-range information.

7. A system for distributing data among mobile stations via a base-station network, the system comprising:
a plurality of base stations;
a data distribution apparatus; and
a base-station network via which the plurality of base stations and the data distribution apparatus are coupled with each other, wherein
each of the plurality of base stations is configured to:
transmit a first range-check message to first other base stations included in the plurality of base stations via the base-station network, the first range-check message including designated-range information that defines a service-area range indicating a range of a service area to which distribution data is to be distributed,
detect a first response message that is transmitted from first one or more base stations included in the first other base stations in response to the first range-check message, the first response messages including first cell information identifying cells that are covered by the first one or more base stations, and
transmit the first cell information, via the base-station network, to the data-distribution apparatus; and
the distribution apparatus is configured to distribute the distribution data destined for mobile stations, via the base-station network, to the first one or more base stations identified by the first cell information, wherein
the each base station, upon receiving a second range-check message from another base station, determines whether a cell covered by the each base station belongs to the service-area range defined by designated-range information included in the received second range-check message; and
when it is determined that a cell covered by the each base station belongs to the service-area range, the each base station transmits, in response to the second range-check message, a second response message including second cell information identifying a cell covered by the each base station, to the another base station via the base-station network;
the each base station, upon receiving the second range-check message from a first adjacent base station located adjacent to the each base station, transfers the received second range-check message to a second adjacent base station located adjacent to the each base station;

the designated-range information defines, as the service-area range, a hop count of the second range-check message wherein the hop count of the second range-check message indicates a number of times the second range-check message is transferred between a pair of adjacent base stations in the base-station network; and the each base station determines whether a cell covered by the each base station is within the service-area range defined by the designated-range information, based on the hop count of the second range-check message.

8. The system of claim 7, wherein the data distribution apparatus is configured to:

receive position information indicating a reference position of the service-area range from a first base station that is included in the plurality of base stations and has received the position information from a mobile station, determine, from among the plurality of base stations, a second base station corresponding to the reference position, and notify the second base station of notification indicating the service-area range; and the second base station transmits, in response to the notification, the first range-check message to second other base stations included in the plurality of base stations via the base-station network.

9. The system of claim 7, wherein the data distribution apparatus stores mobile-station designation information that stores a mail address of a first mobile station in association with a first base station included in the first one or more base stations; and the data distribution apparatus transmits the distribution data to the first mobile station using the mail address that is stored in the mobile-station designation information in association with the first base station.

10. A method for distributing data among mobile stations via a base-station network, the method being performed by a base station included in the base-station network, the method comprising:

transmitting a first range-check message, via the base-station network, to other base stations in the base-station network, the first range-check message including designated-range information that defines a service-area range indicating a range of a service area to which distribution data is to be distributed within the base-station network;

detecting first response messages that are transmitted from one or more base stations included in the other base stations, via the base-station network, in response to the first range-check message, the first response messages including first cell information identifying cells that are covered by the one or more base stations;

transmitting the first cell information, via the base-station network, to a data-distribution apparatus that distributes the distribution data to one or more mobile stations located within the service-area range via the base-station network;

upon receiving a second range-check message from another base station included in the base-station network, determining whether a cell covered by the base station belongs to the service-area range defined by the designated-range information included in the received second range-check message;

when it is determined that a cell covered by the base station belongs to the service-area range defined by the designated-range information, transmitting a second response message including second cell information identifying a cell covered by the base station to the another base station via the base-station network;

upon receiving the second range-check message from a first adjacent base station located adjacent to the apparatus, transferring the received second range-check message to a second adjacent base station;

the designated-range information defining, as the service-area range, a hop count of the second range-check message wherein the hop count of the second range-check message indicates a number of times the second range-check message is transferred between a pair of adjacent base stations in the base-station network; and determining whether a cell covered by the base station is within the service-area range defined by the designated-range information, based on the hop count of the second range-check message.

\* \* \* \* \*